US009860935B2

(12) United States Patent
Teyeb et al.

(10) Patent No.: US 9,860,935 B2
(45) Date of Patent: Jan. 2, 2018

(54) SELECTION OF RRC CONFIGURATION IN A WIRELESS COMMUNICATION NETWORK BASED ON NETWORK STATE

(71) Applicant: Telefonaktiebolaget L M Ericsson (publ), Stockholm (SE)

(72) Inventors: Oumer Teyeb, Solna (SE); Mattias Tan Bergström, Stockholm (SE); Yu Wang, Solna (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 76 days.

(21) Appl. No.: 14/437,304

(22) PCT Filed: Oct. 24, 2013

(86) PCT No.: PCT/SE2013/051247
§ 371 (c)(1),
(2) Date: Apr. 21, 2015

(87) PCT Pub. No.: WO2014/065752
PCT Pub. Date: May 1, 2014

(65) Prior Publication Data
US 2015/0282246 A1 Oct. 1, 2015

Related U.S. Application Data

(60) Provisional application No. 61/729,779, filed on Nov. 26, 2012, provisional application No. 61/717,785, filed on Oct. 24, 2012.

(51) Int. Cl.
H04W 4/00 (2009.01)
H04W 76/04 (2009.01)
(Continued)

(52) U.S. Cl.
CPC .......... H04W 76/046 (2013.01); H04L 12/18 (2013.01); H04W 36/0072 (2013.01); H04W 76/021 (2013.01); H04W 88/08 (2013.01)

(58) Field of Classification Search
CPC ......................... H04W 36/04; H04W 72/0413
(Continued)

(56) References Cited

U.S. PATENT DOCUMENTS

2007/0147370 A1* 6/2007 Hasegawa ............. H04W 36/06
370/390
2009/0170441 A1* 7/2009 Eckert .................. H04W 24/10
455/67.11
(Continued)

FOREIGN PATENT DOCUMENTS

WO 2010006650 A1 1/2010
WO 2010093156 A2 8/2010
(Continued)

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.1.0, Sep. 2012, 1-325.

Primary Examiner — Iqbal Zaidi
(74) Attorney, Agent, or Firm — Murphy, Bilak & Homiller, PLLC

(57) ABSTRACT

A method and wireless device (700) for applying a Radio Resource Control, RRC, configuration in a radio communication between the wireless device and a serving base station (702a) of a wireless communication network (702). The wireless device (700) obtains a set of RRC configurations (704), each RRC configuration comprising a plurality of radio parameters dictating how the wireless device should operate in the network (702). The wireless device (700) further receives an indication (706) from the serving base
(Continued)

station reflecting a network state of the wireless communication network (702), and then selects and applies an RRC configuration out of the set of RRC configurations, based on the received indication. Thereby, capacity and performance can be improved in the network by reduced signalling with the wireless device (700) and more flexible usage of RRC configuration suitable for the network state.

28 Claims, 6 Drawing Sheets

(51) Int. Cl.
  *H04W 36/00* (2009.01)
  *H04L 12/18* (2006.01)
  *H04W 76/02* (2009.01)
  *H04W 88/08* (2009.01)

(58) Field of Classification Search
  USPC .................................................. 370/252–465
  See application file for complete search history.

(56) References Cited

U.S. PATENT DOCUMENTS

| | | |
|---|---|---|
| 2013/0003672 A1 | 1/2013 | Dinan et al. |
| 2013/0083661 A1* | 4/2013 | Gupta ................... H04W 4/005 370/235 |

FOREIGN PATENT DOCUMENTS

| | | |
|---|---|---|
| WO | 2012062766 A1 | 5/2012 |
| WO | 2013001333 A1 | 1/2013 |

* cited by examiner

| Network State | UE State | RRC Configuration |
|---|---|---|
| A | 1 | Conf A.1 |
|   | 2 | Conf A.2 |
|   | 3 | Conf A.3 |
|   | . |   |
|   | . |   |
|   | N | Conf A.N |
| B | 1 | Conf B.1 |
|   | 2 | Conf B.2 |
|   | 3 | Conf B.3 |
|   | . |   |
|   | . |   |
|   | M | Conf B.M |
| C | 1 | Conf C.1 |
| . | . | . |
| ⋮ | ⋮ | ⋮ |

SELECTION OF RRC CONFIGURATION IN A WIRELESS COMMUNICATION NETWORK BASED ON NETWORK STATE

TECHNICAL FIELD

The present disclosure relates generally to a base station of a wireless communication network, a wireless device, and methods therein, for enabling usage of a Radio Resource Control, RRC, configuration in radio communication between the wireless device and the base station.

BACKGROUND

In recent years, different types of networks for wireless communication have been developed to provide radio communication for various wireless terminals in different areas. The wireless communication networks are constantly improved to provide better capacity, performance and coverage to meet the demands from subscribers using services and increasingly advanced terminals, such as smartphones and tablets, which often require considerable amounts of bandwidth and resources for data transport in the networks. Therefore, it is often a challenge to minimize or reduce the amount of signaling between base stations in the wireless communication network and various wireless devices being connected to the base stations for radio communication.

In this field, the term "wireless device" is commonly used and will be used in this disclosure to represent any wireless communication entity capable of radio communication including receiving downlink signals transmitted from a serving base station and sending uplink signals to the base station. Another common term is "User Equipment, UE" which implies that the communication entity can be held and operated by a human user such as a mobile telephone. However, a wireless device in this context is not necessarily held and operated by a human user. It could also be a machine-to-machine type of device operating automatically such as a sensor, counter or measuring entity.

Further, the term "base station", also commonly referred to as a network node, radio node, e-nodeB, eNB, NB, base transceiver station, etc., represents any node of a wireless communication network that is arranged to communicate uplink and downlink radio signals with wireless devices. The base stations described here may, without limitation, include so-called macro nodes or base stations and low power nodes or base stations such as micro, pico, femto, Wifi and relay nodes or base stations, to mention some customary examples. Throughout this disclosure, the terms "network node" and "User Equipment, UE" could further be used instead of base station and wireless device, respectively.

As indicated above, it is generally of interest to keep the amount of signaling between wireless devices and base stations as low as possible, although without losing functionality, in order to save radio resources that are much needed for communication of data over radio to serve the wireless devices with various services involving transfer of data to and from the wireless devices. Such signaling includes communication of configuration messages from the network to the wireless devices containing various radio parameters dictating how the wireless device should act or behave during radio communication. Some of these radio parameters may pertain to how and/or when measurements of radio signals shall be performed by the wireless device e.g. to evaluate its current connection with a serving base station and also potential connections with other nearby target base stations. Further radio parameters in a configuration message may pertain to how and/or when the wireless device's measurements should be reported to the serving base station, and to other communication specifics related to transmission schemes, encoding, modulation, and so forth.

In a network that employs Long Term Evolution, LTE, as defined by the Third Generation Partnership Project, 3GPP, a wireless device can be in either CONNECTED mode or IDLE mode. In short, the wireless device is able to communicate data with a base station when it is in the CONNECTED mode while it just monitors various information and messages transmitted from the network when the wireless device is in the IDLE mode. In the CONNECTED mode, a protocol called Radio Resource Control, RRC, is employed which is defined in the LTE standard according to the document 3GPP TS 36.331. Whenever a wireless device enters the CONNECTED mode and becomes connected to a serving base station, i.e. a base station of a serving cell, for performing a radio communication, the serving base station transmits a control message to the wireless device containing an RRC configuration applicable for the wireless device, thus comprising a plurality of radio parameters that the wireless device is thereby instructed to apply in the radio communication, e.g. as exemplified above. This control message may be communicated by broadcast signaling to any wireless devices, multicast signaling to a specific set of wireless devices and/or unicast signaling to a single specific wireless device.

When a wireless device is in CONNECTED mode, an RRC connection is thus maintained with the currently serving base station or serving cell. Some common and rather static RRC related radio parameters, which are applicable to many wireless devices, may be communicated in a System Information Block called SIB2 using an information element called radioResourceConfigCommon. Dedicated RRC configurations are sent to a specific wireless device, either at RRC connection setup, e.g. when the wireless device switches from IDLE to CONNECTED mode, or at RRC re-establishment, e.g. when the wireless device recovers from a Radio Link Failure, or at RRC Connection Reconfiguration, e.g. after a handover to another cell and serving base station.

However, it is a problem that the above-described configuration messages can be quite large containing a considerable amount of information elements which consume radio resources when communicated to the wireless devices. Further, these large RRC configuration messages are typically communicated to each wireless device at several occasions, such as exemplified above. As a result, the capacity and performance in the network for data communication may suffer greatly due to the communication of such RRC configuration messages to multiple wireless devices, which thus occupy considerable bandwidth in the radio interface. FIG. 1 illustrates this situation where a wireless device 100 is in radio communication when first connected to a serving base station 102 which communicates an RRC configuration C1 to the wireless device 100 to dictate the wireless device's behavior.

While the wireless device 100 remains in connection with base station 102, the latter may decide that the wireless device's behavior needs to change, e.g. due to changing conditions such as increased traffic, to improve performance and efficiency in the network and/or for the wireless device. The base station 102 therefore communicates another RRC configuration C1' to the wireless device 100 in an RRC message to carry out RRC Connection Reconfiguration, where one or more radio parameters in C1' are different than in C1, to dictate the wanted modification of wireless device behavior. For example, the new RRC configuration C1' may comprise a modified radio parameter that results in a handover to another base station thereby off-loading the base station 102. When the RRC configuration C1' is communicated to the wireless device 100, it overrides the RRC configuration C1 in the wireless device 100. For various reasons, the base station 102 may communicate different RRC configurations to the wireless device 100 at different occasions which generates much signaling traffic since each RRC configuration is quite large.

FIG. 1 further illustrates that the wireless device 100 is handed over to another base station 104 which then communicates an RRC configuration C2 to the wireless device 100 to dictate the wireless device's behavior in the cell of base station 104. The base station 104 may likewise communicate multiple RRC configurations C2, C2' . . . to the wireless device 100 at different occasions as long as the wireless device 100 remains connected to the base station 104. The same situation may occur when the wireless device 100 is further handed over to another base station 106 which then communicates one or more RRC configurations C3, C3' . . . to the wireless device 100 to dictate the wireless device's behavior while in the cell of base station 106, and so forth. Each time a new RRC configuration is communicated to the wireless device 100, it overrides the existing RRC configuration in the wireless device 100. It can thus be understood that the current solution, as exemplified in FIG. 1, generates many RRC configuration messages from the network to different wireless devices which consumes precious bandwidth on the radio interface.

SUMMARY

It is an object of embodiments described herein to address at least some of the problems and issues outlined above. This object and others may be achieved by using a wireless device, a base station, and methods therein as defined in the attached independent claims.

According to one aspect, a method is performed by a wireless device to apply a Radio Resource Control, RRC, configuration in a radio communication between the wireless device and a base station of a wireless communication network. In this method, the wireless device obtains a set of RRC configurations, each RRC configuration in the set comprising a plurality of radio parameters dictating how the wireless device should operate during radio communication in the wireless communication network. The wireless device further receives from the base station an indication reflecting a network state of the wireless communication network, and selects an RRC configuration out of the set of RRC configurations, based on the received indication reflecting the network state. The wireless device then applies the selected RRC configuration in the radio communication with the base station.

According to another aspect, a wireless device is arranged to apply an RRC configuration in a radio communication between the wireless device and a base station of a wireless communication network. The wireless device comprises a receiver configured to receive from the base station an indication reflecting a network state of the wireless communication network. The wireless device further comprises a processing circuit that is configured to have access to a set of RRC configurations. In this set, each RRC configuration comprises a plurality of radio parameters dictating how the wireless device should operate during radio communication in the wireless communication network. The processing circuit is also configured to select an RRC configuration out of the set of RRC configurations based on the indication reflecting the network state. The processing circuit is further configured to apply the selected RRC configuration in the radio communication with the base station.

According to another aspect, a method is performed by a base station of a wireless communication network to control usage of an RRC configuration in a radio communication between a wireless device and the base station. In this method, the base station sends an indication reflecting a network state of the wireless communication network to the wireless device to enable the wireless device to select an RRC configuration out of a set of RRC configurations based on the indication reflecting the network state. Each RRC configuration in the set comprises a plurality of radio parameters dictating how the wireless device should operate during radio communication in the wireless communication network.

According to another aspect, a base station of a wireless communication network is arranged to control usage of an RRC configuration in radio communication between a wireless device and the base station. The base station comprises a radio circuitry that is configured to send an indication reflecting a network state of the wireless communication network to the wireless device to enable the wireless device to select an RRC configuration out of a set of RRC configurations based on the indication reflecting the network state, each RRC configuration in the set comprising a plurality of radio parameters dictating how the wireless device should operate during radio communication in the wireless communication network.

By using any of the methods, wireless device and base station described above, signaling with the wireless device and required bandwidth will be reduced as compared to conventional procedures, while more flexible and/or suitable usage of RRC configuration may be achieved as well. Thereby, capacity and/or performance may be improved in the network. The above methods, wireless device and base station may be arranged and implemented according to different optional embodiments to accomplish further features and benefits, to be described below.

BRIEF DESCRIPTION OF DRAWINGS

The solution will now be described in more detail by means of exemplary embodiments and with reference to the accompanying drawings, in which.

DETAILED DESCRIPTION

In this solution, it has been recognized that a wireless device may repeatedly receive more or less the same RRC configurations from a wireless communication network which may be sent from one or more serving base stations at different occasions, e.g. at the above-mentioned occasions of RRC connection setup, RRC re-establishment and RRC Connection Reconfiguration which may be sent after a handover.

Therefore, the signaling of such lengthy RRC configurations at numerous occasions can be avoided if the wireless device first obtains a set of RRC configurations, e g from the wireless communication network, which set has been determined for the wireless device, such that the wireless device is able to select one of the RRC configurations in the received set later on at several occasions instead of receiving it in full from the serving base station. It has also been recognized that different RRC configurations are suitable to employ at different network states depending on e.g. load of the wireless communication network and on which features are active in the wireless communication network. The different network states may pertain to different wireless devices on an individual and/or group basis, e g to control the selection of RRC configuration by such devices. The wireless device selects an RRC configuration from the obtained RRC configuration from the set of RRC configurations depending on a network state that may be indicated by each base station that is serving the wireless device, which will be described in more detail below.

Radio resources can thus be saved since the set of RRC configurations may be communicated just once and for all, more or less, and drastically less radio resources are required to convey an indication of network state as compared to convey an entire RRC configuration at several occasions. This indication may be encoded by just a few information bits. The solution may be realized by means of a wireless device and a base station as follows.

Figure 1:
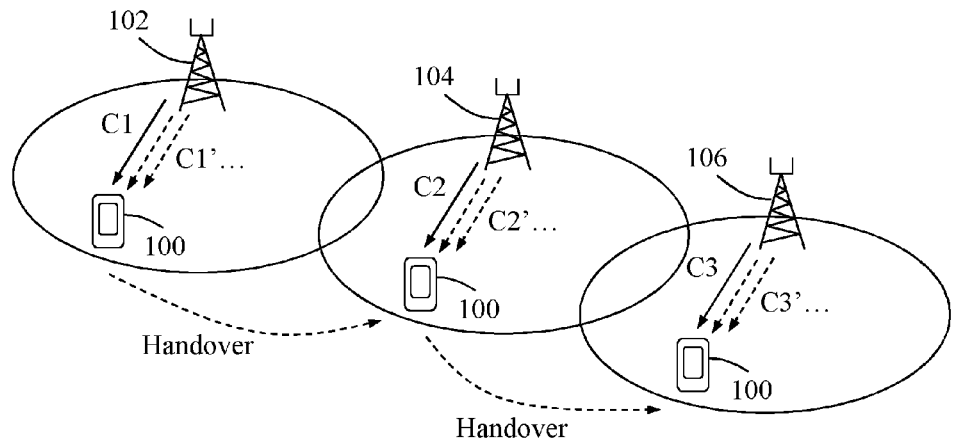
FIG. 1 illustrates a scenario involving a wireless device in radio communication with different base stations, according to the prior art.
Figure 2:
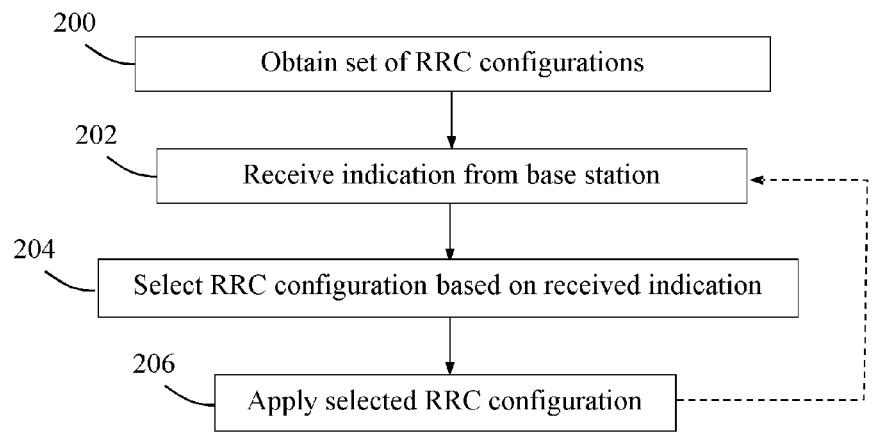
FIG. 2 is a flow chart illustrating a procedure in a wireless device to apply an RRC configuration, according to some possible embodiments.

The solution and some possible embodiments will be outlined firstly with reference to the flow chart of FIG. 2 which illustrates actions performed by a wireless device. These actions may thus be executed by the wireless device to apply an RRC configuration in a radio communication between the wireless device and a base station of a wireless communication network. The base station may in some embodiments be the base station currently serving the wireless device.

A first action 200 illustrates that the wireless device obtains a set of RRC configurations. The set of RRC configurations may, according to some embodiments, be obtained from the wireless communication network. The set of RRC configurations may have been determined for the wireless device by the network. For example, the set of RRC configurations may have been received from the above-mentioned serving base station or from another base station of the wireless communication network when it was serving the wireless device at an earlier occasion. Thus, the wireless device may receive the set from any base station when connected to the network, e.g. from the first base station that serves the wireless device after it has been turned on. Each RRC configuration in the set comprises a plurality of radio parameters dictating how the wireless device should operate during radio communication in the wireless communication network. These radio parameters may include any of the exemplified radio parameters mentioned above.

Thus in some possible embodiments, the radio parameters in the set of RRC configurations may pertain to at least one of: measurements of radio signals, reporting of measurements, transmission schemes, encoding and modulation. Further possible examples of radio parameters that may be included in the RRC configurations are: Establishment/modification/release of resource blocks carrying user data, Radio configuration control including e.g. assignment/modification of Automatic Repeat Request (ARQ) configuration, Hybrid Automatic Repeat Request (HARQ) configuration, Discontinuous reception (DRX) configuration. Further, in case carrier aggregation is used, examples of radio parameters that may be included in the RRC configurations are: cell management including e.g. change of Primary Cell, addition/modification/release of Secondary Cell(s) and addition/modification/release of Timing Advance Groups (TAG(s)), Quality of Service (QoS) control including assignment/modification of semi-persistent scheduling (SPS) configuration information for downlink and uplink, assignment/modification of parameters for uplink rate control in the wireless device, i.e. allocation of a priority and a prioritized bit rate (PBR) for each resource block, Recovery from radio link failure, Generic protocol error handling, Support of self-configuration and self-optimization.

In a next action 202, the wireless device receives, from the base station currently serving the wireless device, an indication reflecting a network state of the wireless communication network. This network state indication is thus sent from the base station when it has detected a state of the network which may relate to a load from traffic in the wireless communication network, and/or to features that are active in the wireless communication network such as carrier aggregation or DRX to mention a few non-limiting examples. The network state may relate to or reflect the load or features in a way that is specific to the wireless device, so as to induce a desired behavior of the wireless device. The network state indication may be a very short index value, such as a number or code or the like, that is associated with the indicated network state. In a next action 204, the wireless device selects an RRC configuration out of the received set of RRC configurations, based on the received indication reflecting the network state. Thereby, the wireless device's selection of RRC configuration in dependency of the network state can easily be controlled by the base station by sending the short indication of network state instead of sending the more lengthy entire RRC configuration to the device, thus using less resources for signaling.

A final action 206 illustrates that the wireless device applies the selected RRC configuration in the radio communication with the base station, e.g. by using one or more of the radio parameters included in the RRC configuration selected in action 204. It is an advantage of the procedure of FIG. 2 that the wireless device can easily apply an RRC configuration with radio parameters that are suitable and adapted according to the network state. Another advantage is that the wireless device is able to rapidly adapt its usage of radio parameters to a changed network state by receiving another network state indication from the serving base station and select a corresponding RRC configuration, with a very limited amount of signaling. The usage of radio parameters as such may be controlled according to conventional procedures, for example by signaling from the serving base station, and/or by functionality operating within the wireless device.

After action 206, the wireless device may return to action 202, as shown by a dashed arrow in FIG. 2, and receive another indication reflecting a network state either from the same base station or from a new base station if the wireless device has been connected to the new base station. Thus, actions 202-206 may be repeated whenever a new indication reflecting a network state is received, which indication the base station may send whenever the network state changes or when a different behavior of the wireless device is desired. It should be noted that the action 200 of obtaining the set of RRC configurations only needs to be performed once, as long as the same set of RRC configurations are valid for the wireless device. It should further be noted that the UE does not need to know the "network state" as such. Subsequently, the action 202 of receiving an indication may be performed several times at different occasions as exemplified above, which requires considerably less resources and bandwidth on the radio interface, as compared to conventional procedures.

Figure 3:
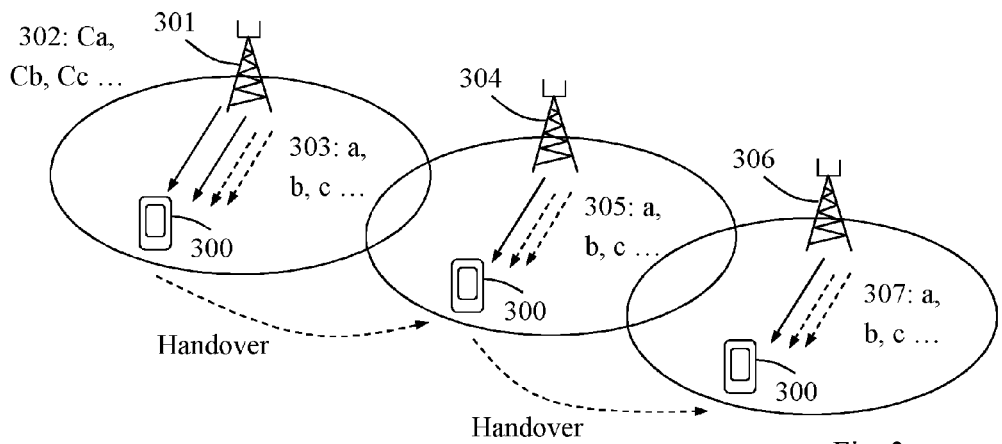
FIG. 3 illustrates an exemplifying scenario involving a wireless device in radio communication with different base stations, when some possible embodiments are employed.

FIG. 3 illustrates an example of how the above procedure may be implemented in practice. In this example, a wireless device 300 is first present in a first cell and is served by a base station 301 and then moves to another cell and is served by a base station 304 and further moves to another cell and is served by a base station 306. As mentioned above, a new RRC configuration is normally sent to a wireless device whenever it is handed over to a new serving base station, to be applied by the wireless device in radio communication with the currently serving base station. This may be done in a more efficient way that requires less signaling and bandwidth than the conventional procedures as follows, basically in accordance with the procedure of FIG. 2.

When the wireless device 300 is initially served by base station 301 in the first cell, it receives from the wireless communication network via or from the base station 301 in this case, a set of RRC configurations 302, basically as described for action 200 above. The set 302 thus comprises a number of RRC configurations with different combinations of radio parameters. The set of RRC configurations 302 for the wireless device 300 may in some embodiments have been determined by the base station 301. In other embodiments the set of RRC configurations 302 for the wireless device 300 may have been received by the base station 301 from another entity or node in the wireless communication network. The set of RRC configurations 302 may have been determined and adapted for or in accordance with capabilities of the wireless device 300 such that the set 302 is thereby "device-specific" in this context. The RRC configurations sent to the wireless device 300 are schematically denoted Ca, Cb, Cc, and so forth.

Then the wireless device 300 also receives from the base station 301 an indication 303 denoted "a" of a network state of the wireless communication network, basically corresponding to action 202 above. The network state indication "a" suggests one of the RRC configurations in the received set 302, and the wireless device 300 is able to select and apply that RRC configuration suggested by indication "a", as described for actions 204 and 206. When present in the first cell, the wireless device 300 may receive from the base station 301 any number of further indications 303, schematically denoted "b", "c", ..., of a network state of the wireless communication network, for whatever reason, and then select and apply RRC configurations accordingly.

Once the wireless device 300 moves to the other cells served by base stations 304 and 306, it receives in the same manner one or more indications 305 and 307 of network state from the new serving base stations 304 and 306, respectively, and the wireless device 300 selects and applies RRC configurations accordingly. As mentioned above, a new RRC configuration is conventionally sent to the wireless device after handover. In contrast to what is achieved in conventional procedures, the new RRC configuration can thus, be conveyed with a minimum of signaling when the solution presented herein is used.

The actions shown in FIG. 2 and described above, i.e. with reference to FIGS. 2 and 3, may be implemented in practice according to various optional embodiments. In some possible embodiments, the network state may pertain to at least one of: a load of the wireless communication network and one or more features active in the wireless communication network. Examples of such features that may be active in the network include the above-mentioned carrier aggregation, ARQ/HARQ, SPS, DRX, and so forth. In some embodiments the network state may relate to or reflect the load or features in a way that is specific to the wireless device, so as to induce a desired behavior of the wireless device.

In another possible embodiment, the wireless device 300 may select an RRC configuration out of the obtained set of RRC configurations 302 further based on a device state reflecting a state of the wireless device 300. It is thus recognized in this solution that the radio communication may be improved by adapting the RRC configuration not only to different network states as described above, but also to different device states.

To mention some possible examples, the wireless device state may pertain to at least one of the following: traffic activity of the wireless device 300, the wireless device's capability of using radio technologies, one or more radio technologies used by the wireless device 300, the wireless device's remaining battery power level, the wireless device's usage of one or more radio bearers, the wireless device's amount of available power, the wireless device's usage of one or more services, and number of carriers used by the wireless device 300.

In another possible embodiment, the wireless device 300 may select the RRC configuration out of the obtained set of RRC configurations 302 from a look-up table that has been configured in the wireless device 300, which look-up table maps the obtained set of RRC configurations 302 to different indications of network states. The wireless device 300 may obtain or receive the look-up table from the wireless communication network together with the set of RRC configurations 302 when obtained or received in action 200 above, e.g. in a joint message or in two separate messages. Furthermore, the look-up table may also map the received set of RRC configurations 302 to different device states. An example of such a mapping table will be described later below with reference to FIG. 8.

In another possible embodiment, The wireless device 300 may inform the base station 301, 304, 306 about the selected RRC configuration, to confirm that the wireless device 300 will apply the RRC configuration in accordance with the network state that was signaled by the base station 301, 304, 306 by means of the indication 303, 305, 307. In yet another possible embodiment, the received set of RRC configurations 302 may be device-specific and adapted for or in accordance with capabilities of the wireless device 300. Before sending the set of RRC configurations 302 to the wireless device 300, the base station 301 may thus be configured to determine the set of RRC configurations 302 for the wireless device based on capabilities of the wireless device 300. Alternatively or additionally, the base station 301 may have received the set of RRC configurations 302, or at least a part thereof, from another entity or node in the wireless communication network.

In further possible embodiments, the indication 303, 305, 307 reflecting the network state may be received from the base station 301, 304, 306 by different ways of signaling, including at least one of the following: by broadcast signaling not addressed to any particular wireless device(s), by multicast signaling addressed to or targeting a particular group of wireless devices including the wireless device 300 described herein, and/or by unicast signaling addressed to or targeting only the wireless device 300 described herein. Furthermore, the indication 303, 305, 307 in the unicast signaling and/or the indication 303, 305, 307 in the multicast signaling may be the same as or different than the indication 303, 305, 307 in the broadcast signaling. In any case, the wireless device 300 may prioritize selecting RRC configuration based on the indication in the unicast signaling over selecting RRC configuration based on the indication in the multicast signaling and prioritize selecting RRC configuration based on the indication in the multicast signaling over selecting RRC configuration based on the indication in the broadcast signaling. In another possible embodiment, the unicasted indication and/or the multicasted indication may be assigned an expiry time after which the wireless device 300 selects RRC configuration based on the broadcasted indication instead.

Figure 4:
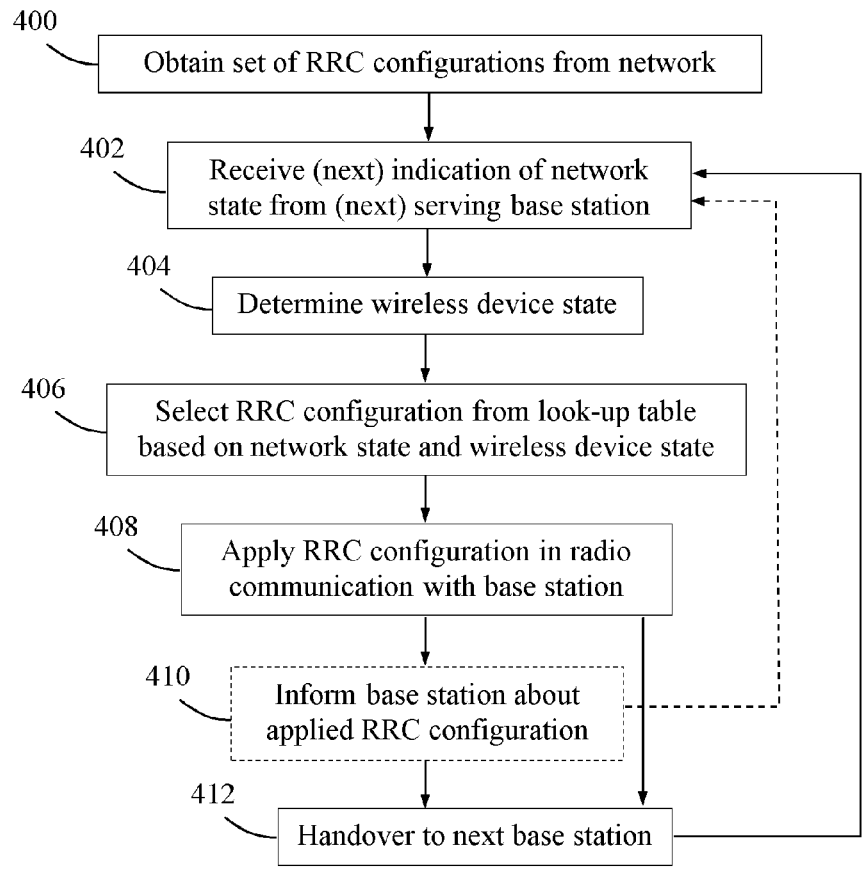
FIG. 4 is another flow chart illustrating a procedure in a wireless device in more detail, according to further possible embodiments.

It was mentioned above that the wireless device may select an RRC configuration out of the obtained or received set of RRC configurations based on both the indication of network state and a device state by means of a look-up table. A more detailed procedure performed by a wireless device when such embodiments are used, will now be described with reference to the flow chart in FIG. 4. In a first action 400, the wireless device obtains a set of RRC configurations, basically as described above for action 200. The wireless device then receives an indication of network state in a subsequent action 402, basically as described above for action 202.

The wireless device further determines its own device state in a subsequent action 404. Some examples of possible device states have been described above. In a next action 406, the wireless device selects an RRC configuration out of the obtained set of RRC configurations, from the look-up table based on both the network state indication received in action 402 and the device state determined in action 404. A further action 408 illustrates that the wireless device applies the selected RRC configuration in a radio communication with the serving base station, basically as described above for action 206. Another action 410 illustrates that the wireless device may also inform the serving base station about the applied RRC configuration, to enable the base station to also apply the same RRC configuration in the radio communication. If the wireless device at this point would receive another indication of network state from that base station, the process may return to action 402 as long as the base station serves the wireless device as shown by the dashed arrow for repeating actions 402-410.

A further action 412 illustrates that the wireless device is eventually handed over to another base station which thus becomes the next serving base station. In that case, the process may return to action 402 as shown by the full arrow for repeating actions 402-410 in order to receive a next indication of network state from the next serving base station.

A procedure, performed by a base station of a wireless communication network, to control usage of an RRC configuration in a radio communication between a wireless device and the base station, will now be described with reference to FIG. 3 and the flow chart of FIG. 5. These actions may thus be executed by the base station 301 when serving the wireless device 300.

In this procedure a first action 500 illustrates that the base station 301 may detect capabilities of the wireless device 300 which may be done by detecting what type of device it is and what functionality and features it is capable of using. Another action 502 illustrates that the base station 301 may determine a set of RRC configurations 302 for the wireless device 300, which set may be adapted to the detected capabilities of the wireless device 300. Each RRC configuration in the set comprises a plurality of radio parameters dictating how the wireless device 300 should operate during radio communication in the wireless communication network. For example, it may be suitable that the RRC configurations in the set comprise radio parameters that the wireless device 300 is capable of using while such radio parameters that the wireless device 300 is not capable of using may be omitted, in accordance with the capabilities detected in action 500.

In a further action 504, the base station 301 may send the determined set of RRC configurations 302 to the wireless device 300, which corresponds to actions 200 and 400 above. Alternatively, the wireless device 300 may have already obtained such a set of RRC configurations from a previously serving base station, as described above. This may for example be the case when the wireless device is served by base station 304, 306, and the wireless device has previously been served by base station 301. Another action 506 illustrates that the base station 301, 304, 306 may detect a state of the wireless communication network, e.g. a current state pertaining to load or active functions as described above. This action may in practice be performed repeatedly at any time such that the base station 301, 304, 306 is more or less continually aware of the current network state.

A final shown action 508 illustrates that the base station 301, 304, 306 sends an indication 303, 305, 307 reflecting the network state of the wireless communication network to the wireless device 300, which corresponds to actions 202 and 402 above. Thereby, the wireless device 300 is enabled to select, based on the indication 303, 305, 307 reflecting the network state, an RRC configuration out of a set of RRC configurations 302 that it has received previously, e.g. as of action 504.

In another possible embodiment, also applicable to the wireless device 300 of FIG. 3, the set of RRC configurations received by the wireless device may comprise a first subset of RRC configurations valid in several cells of the wireless communication network and a second subset of cell-specific RRC configurations valid only when the wireless device is connected to the base station via a specific cell or a cell in a specific group of cells. This embodiment is illustrated by an example scenario shown in FIG. 6 where the wireless device 600, denoted "WD", is initially served by a base station 602 and is then handed over to be served by another base station 604 and is then again handed over to be served by yet another base station 606. The wireless device 600 may have been turned on initially to be served by base station 602, although the described embodiment is not limited in this respect.

The wireless device 600 first receives from base station 602 the set of RRC configurations comprising a first subset of RRC configurations, denoted "Cx", which is valid in several cells and a second subset of cell-specific RRC configurations, denoted "Cy1", which is valid only when the wireless device is connected to the base station 602, i.e. in the cell or cells served by base station 602. The wireless device 600 saves the received set Cx+Cy1 in a memory "m" and is able to select an RRC configuration from the set Cx+Cy1 in the manner described above, wherein the first subset Cx may be used in other cells as well. In other words, the first subset of RRC configurations Cx comprises radio parameters that can be used in several cells and therefore the device keeps the first subset set Cx in its memory for use in other cells, while the second subset Cy1 may be deleted once the wireless device 600 is handed over to another cell where the second subset Cy1 is not valid or applicable.

When handed over to the next base station 604, the wireless device 600 receives from base station 604 another second subset of cell-specific RRC configurations, denoted "Cy2", which is valid only when the wireless device is connected to the base station 604, i.e. in the cell or cells served by base station 604. The wireless device 600 saves the received subset Cy2 in a memory "m" and is able to select an RRC configuration from the set Cx+Cy2 in the manner described above. As mentioned above, the previously received subset Cy1 may be deleted from memory "m" at this point.

Figure 6:
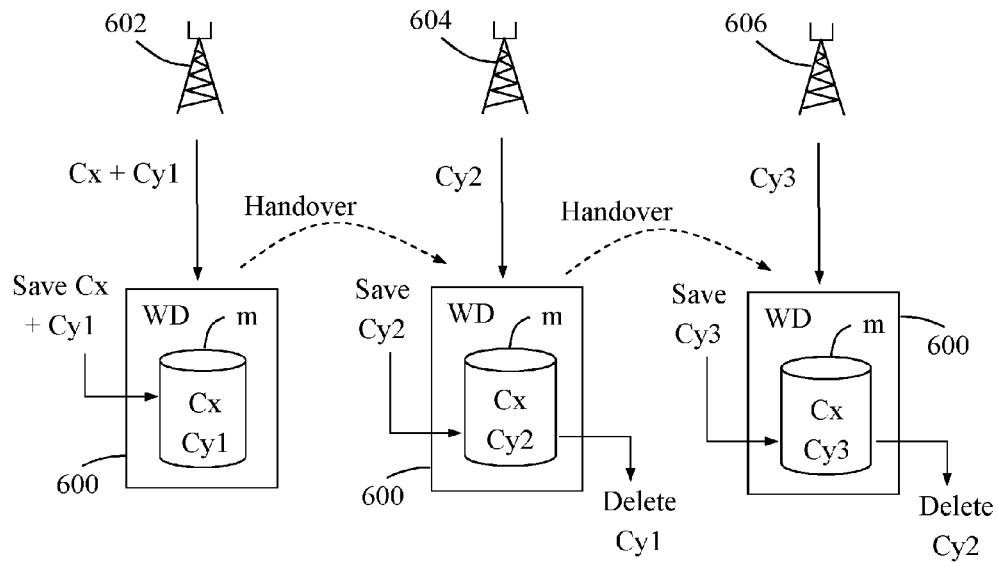
FIG. 6 illustrates another exemplifying scenario involving a wireless device in radio communication with different base stations, when further possible embodiments are employed.

FIG. 6 correspondingly illustrates also that after the next handover, the wireless device 600 receives from base station 606 yet another second subset of cell-specific RRC configurations, denoted "Cy3", which is valid only when the wireless device is connected to the base station 606, i.e. in the cell or cells served by base station 606. The wireless device 600 saves the received subset Cy3 in memory "m" and is able to select an RRC configuration from the set Cx+Cy3. The previously received subset Cy2 may at this point be deleted from memory "m" as well. In this embodiment, the wireless device may update its set of RRC configurations, depending on which cell it is present in, with a minimum of signaling, that is without having to receive a complete set of RRC configurations whenever the set of RRC configurations needs to be updated.

Figure 7:
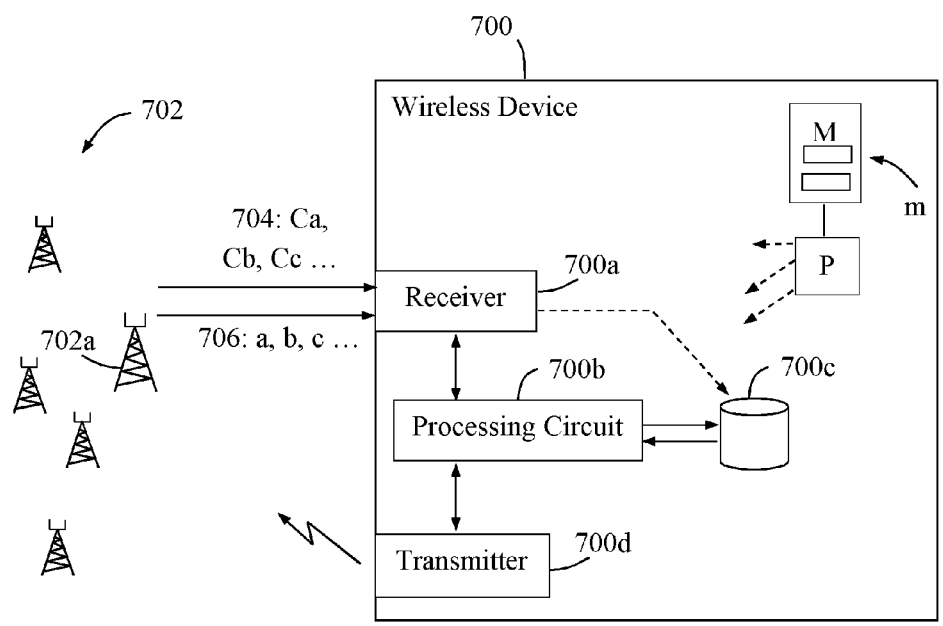
FIG. 7 is a block diagram illustrating a wireless device in more detail, according to further possible embodiments.

A detailed but non-limiting example of how a wireless device may be structured with some possible functional units to bring about the above-described operation of the wireless device, is illustrated by the block diagram in FIG. 7. In this figure, the wireless device 700 is arranged to apply an RRC configuration in a radio communication between the wireless device 700 and a base station 702a of a wireless communication network 702. The wireless device 700 may be configured to operate according to any of the examples and embodiments of employing the solution as described above and as follows.

The wireless device 700 comprises a receiver 700a that is configured to receive from the serving base station 702a an indication 706 reflecting a network state of the wireless communication network 702, basically as described e.g. for actions 202 and 402 above. According to some embodiments, the receiver 700a may further be configured to receive or obtain a set of RRC configurations 704 from the wireless communication network 702, each RRC configuration in the set comprising a plurality of radio parameters dictating how the wireless device 700 should operate during radio communication in the wireless communication network, basically as described e.g. for actions 200 and 400 above. The set of RRC configurations may be stored in a memory 700c, indicated by dashed arrow.

The wireless device 700 further comprises a processing circuit 700b that is configured to have access to the set of RRC configurations 704 and to select an RRC configuration out of the set of RRC configurations 704 being stored in the memory 700c, based on the indication 706 reflecting the network state, basically as described e.g. for actions 204 and 406 above. The processing circuit 700b is also configured to apply the selected RRC configuration in the radio communication with the serving base station 702a, basically as described e.g. for actions 206 and 408 above. The radio communication as such may involve the receiver 700a and a transmitter 700d, e.g. in a conventional manner which is not necessary to describe here any further.

The above wireless device 700 and its functional units may be configured or arranged to operate according to various optional embodiments. In a possible embodiment, the processing circuit 700b may be configured to select an RRC configuration further based on a device state reflecting a state of the wireless device 700, as described above. Examples of what the device state could pertain to have been described above. In another possible embodiment, the processing circuit 700b may be configured to select the RRC configuration from a look-up table which maps the set of RRC configurations 704 to different indications reflecting network states, as described above. An example of such a look-up table is shown in FIG. 8.

In further possible embodiments, the receiver 700a may be configured to receive the indication 706 reflecting the network state from the base station 702a in at least one of: broadcast signaling, multicast signaling and unicast signaling. In yet another possible embodiment, the wireless device may be arranged to inform the base station 702a about the selected RRC configuration. The receiver 700a may also be configured to receive the set of RRC configurations 704 from the base station 702a.

It was mentioned above that wireless device may select the RRC configuration out of the received set of RRC configurations from a look-up table that has been configured in the wireless device, which look-up table maps different RRC configurations in the set to different indications of network states and possibly also to different wireless device states. The wireless device may receive the look-up table from the wireless communication network together with the set of RRC configurations or separately, as also mentioned above.

Figures 8, 9:
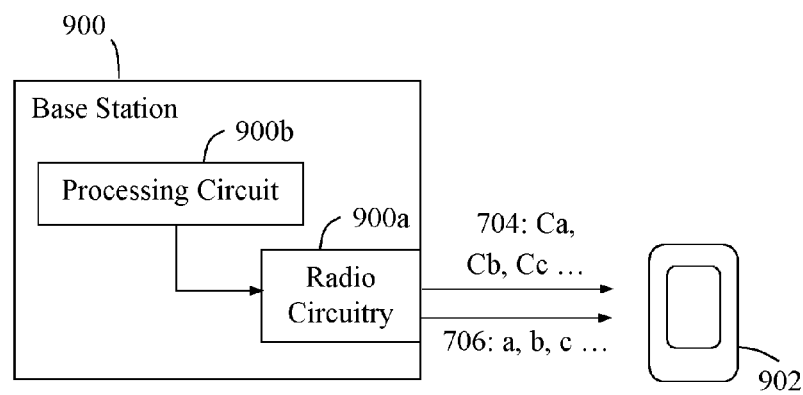
FIG. 8 is an exemplifying look-up table which maps RRC configurations to different device states and different network states, according to further possible embodiments.
FIG. 9 is a block diagram illustrating a base station in more detail, according to some possible embodiments.

FIG. 8 illustrates an example of how such a look-up table may be implemented in practice. In this look-up table, different combinations of an indication of network state "A" and different possible device states, or "UE states", 1, 2, 3, . . . are mapped to different RRC configurations A.1, A.2, A.3 . . . . Further, combinations of another indication of network state "B" and different possible device states, or "UE states", 1, 2, 3, . . . are mapped to different RRC configurations B.1, B.2, B.3 . . . . Still further, combinations of yet another indication of network state "C" and different possible device states, or "UE states", 1, 2, 3, . . . are mapped to different RRC configurations C.1, C.2, C.3 . . . , and so forth. For example, if the wireless device receives the network state indication B from a currently serving base station and also determines its device state 3, the device will select and the RRC configuration B.3 in the look-up table apply it accordingly.

A detailed but non-limiting example of how a base station may be structured with some possible functional units to bring about the above-described operation of the base station, is illustrated by the block diagram in FIG. 9. In this figure, the base station 900 is arranged to control usage of an RRC configuration in radio communication between a wireless device 902 and the base station 900. The base station 900 may be configured to operate according to any of the examples and embodiments of employing the solution as described above and as follows.

The base station 900 comprises a radio circuitry 900a that is configured to send an indication 706 reflecting a network state of the wireless communication network 702 to the wireless device 902, as of action 508 above, to enable the wireless device 902 to select an RRC configuration out of a set of RRC configurations 704 based on the indication 706 reflecting the network state. Each RRC configuration in the set comprises a plurality of radio parameters dictating how the wireless device 902 should operate during radio communication in the wireless communication network 702.

The base station 900 may further comprise a processing circuit 900b that may be configured to determine the set of RRC configurations 704 for the wireless device 902, as of action 502 above. The radio circuitry 900b may also be configured to send the set of RRC configurations 704 to the wireless device, as of action 504 above, e.g. if the device is turned on in the cell served by the base station 900 such that the base station 900 becomes the first one serving the wireless device 902. Further, the processing circuit 900b may be configured to detect a state of the wireless communication network 702, as of action 506 above. The processing circuit 900b may also be configured to detect capabilities of the wireless device 902 in order to determine the set of RRC configurations 704, as of action 500 above.

It should be noted that FIGS. 7 and 9 illustrate some possible functional units in the wireless device 700 and in the base station 900, respectively, and the skilled person is able to implement these functional units in practice using suitable software and hardware. Thus, the solution is generally not limited to the shown structures of the wireless device 700 and the base station 900, and their functional units 700a-b and 900 a-b, respectively, may be configured to operate according to any of the embodiments and features described in this disclosure, where appropriate.

The embodiments and features described herein may be implemented in a computer program comprising computer readable code which, when run on a wireless device and a base station, respectively, causes the wireless device and the base station to perform the above actions e.g. as described for any of FIGS. 2 to 9. Further, the above-described embodiments may be implemented in respective computer program products, each computer program product comprising a computer readable medium on which a computer program is stored. The computer program product may be a compact disc or other carrier suitable for holding the computer program. The computer program comprises computer readable code which, when run on the wireless device 700 and the base station 900, respectively, causes the wireless device 700 and the base station 900 to perform the above-described actions. Some examples of how the computer program and computer program product can be realized in practice are outlined below.

The functional units 700a-b and 900a-b described above for FIGS. 7 and 9 may be implemented in the respective wireless device 700 and base station 900 by means of program modules of a respective computer program comprising code means which, when run by a processor "P" causes the respective wireless device 700 and base station 900 to perform the above-described actions and procedures. The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

Each computer program may be carried by a computer program product in the respective wireless device 700 and base station 900 in the form of a memory "M" having a computer readable medium and being connected to the processor P. The computer program product or memory M thus comprises a computer readable medium on which the computer program is stored e.g. in the form of computer program modules "m". For example, the memory M may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the respective wireless device 700 and base station 900.

In the following text, some further features, details and advantages of the embodiments herein will be described and explained. In the following, the wireless device will sometimes be called UE and the base station will sometimes be called eNB or nodeB or simply node.

The embodiments herein comprise apparatuses and methods for implementing a dynamic and flexible approach to RRC configuration/reconfiguration, wherein RRC configurations are selected in dependence on network and optionally also device state.

For example, a wireless communication network may communicate a set of state-dependent RRC configurations to one or more wireless devices operating in the network. For example, different ones of the RRC configurations in the set correspond to different network and optionally also device states. The network then communicates network state changes to the wireless devices, which dynamically select/apply the RRC configuration that matches the current state information, e.g., the wireless devices select the RRC configurations that match the current network state and optionally also their respective current device state.

Different network states may be communicated to different wireless devices on an individual and/or group basis, e.g., to control the selection of RRC configurations by such devices. For example, different network states may be indicated to wireless devices operating with high QoS requirements as compared to wireless devices operating with low QoS requirements—here, "high" and "low" may be relative terms, or may be based on an absolute measure of QoS, e.g., as defined by rate, jitter, latency and/or other parameters.

Moreover, multiple mechanisms may be used for signaling state-dependent RRC configurations and/or state changes, and different information may be sent via the different mechanisms. For example, general or default state information may be sent by the network on a broadcast basis, and the same or different information may be sent by the network to targeted groups of wireless devices using multicast transmissions and/or to targeted individual wireless devices using unicast transmissions.

It should be noted that although the terminology of LTE is often used as examples to illustrate the different embodiments and features herein, the teachings are equally applicable to systems that have similarities with LTE, such as UMTS/HSPA, where a protocol similar to LTE's RRC is employed to configure UE connections.

Examples of RRC configurations are illustrated in the look-up table shown in FIG. 8. For each network state (A, B, C, . . . ), and each UE state (1, 2, 3, . . . ), there is a mapping to a corresponding RRC configuration in this table. Thus, the table illustrates UE and network state dependent RRC configurations.

A network state may correspond to a combination of many different parameters related to load and active functions such as:
  Network Load
  Actual air interface load.
  License limit on the number of UEs that can be connected per node.
  Backhaul load.
  Other load such as hardware/CPU/memory utilization in the eNBs or other network nodes.
  Active Features
  MIMO support.
  Carrier aggregation.
  Energy saving.

The network state may be defined by a compilation of the states of the core network, transport network, eNB, cell or any other nodes/entities in the network that are involved in serving the UE, some of which may be covered by the example parameters mentioned above.

Some examples are given below illustrating why it may be useful to consider the network's state:
  Measurement configurations:
    If the cell is overloaded, there may be an urgency to offload UEs to other cells. Thus, measurement configurations associated with such a network state could facilitate more offloading by using settings such as shorter Time To Trigger, TTT, or lower measurement triggering thresholds. The S-measure, which tells the UE when to start measuring neighboring cells, for such configurations could also be set to a higher value to ensure that UEs will start measuring neighbor cells even if the serving cell's signals are excellent. The S-measure is an optional parameter and different S-measure values can be specified for initiating intra-frequency, inter-frequency and inter-RAT measurements. If the measured RSRP of the serving cell falls below the S-measure, indicating the signal of the serving cell is not that strong anymore, the UE starts measuring the signal strength of RSs from the neighboring cells.
    If the cell is under-loaded, there may be less urgency to offload UEs to other cells. Thus, the settings could be configured to be the opposite to the overloaded case discussed above.
    If the cell is under-loaded, but if the energy saving feature is activated, there might also be a motivation to offload the few UEs to other cells as that could make it possible for the current serving base station or eNB to go into dormant mode or energy saving mode. Thus, the settings could be configured in a similar fashion as in the overloaded cell case. Alternatively, the settings could be configured so that UEs refrain from connecting to other nodes or base stations and hence these other nodes or base stations may be able to go into dormant/energy saving mode.

Carrier Aggregation: For the sake of these examples, it may be assumed that there are three carriers available both in the uplink, UL, and downlink, DL.
    A configuration associated with an under-loaded DL state could be one that enables the UE to use all the three carriers in the DL.
    A configuration associated with an under-loaded UL state could be one that enables the UE to use all the three carriers in the UL.
    A configuration associated with an highly-loaded DL and UL state could be one that enables the UE to use only one carrier (both in the DL and UL).
  Time Division Duplex, TDD, configurations:
    The network may have signaled to a UE a TDD configuration which is "DL-heavy" for a serving cell (i.e. where there are more downlink subframes than uplink subframes) and one TDD configuration which is "UL-heavy" for the serving cell. In case the network has a high uplink load the network may change the TDD configuration to the UL-heavy TDD configuration and indicate to the UE that it shall use the UL-heavy TDD configuration.

Of course, the associations of network state with measurement, carrier aggregation and TDD configurations, as described above, are non-limiting examples. It is contemplated herein that any one or more of the RRC configuration parameters specified in TS 36.331 v11.1.0 could be included in the settings corresponding to a certain network state.

Also as described above, the UE state, i.e. device state, may also be considered when selecting an RRC configuration. For example:
  If a UE is having, or causing, heavy traffic, and if the cell is overloaded, it may be optimal to offload this particular UE as there is an urgency to offload more UEs to other cells;
  A UE that has a capability to connect via another Radio Access Technology, RAT, e.g. WiFi, may have different RRC configurations than that of a UE that has only LTE access, e.g. measurement reporting can be more relaxed when the UE has a fallback RAT;
  A UE that has the possibility to perform multiple connectivity, e.g. WiFi, may have different RRC configurations than that of a UE that can support only one RAT at a time, e.g. measurement reporting can be more relaxed as the UE has a fallback RAT;
  A UE may have different RRC configurations that depend on its remaining battery power level, e.g. it may be suitable to disable or decrease the frequency of measurements if the UE's battery power falls below a certain level;
  A UE may have different configurations depending on its active bearers (how much traffic is being generated, the QoS settings of the different bearers, the UL/DL traffic symmetry, etc.);
  The amount of power available for transmission in one RAT may depend on whether other RATs are activated or not in the User Equipment (UE). For example, if a UE has both Long Term Evolution (LTE) and WiFi activated, it may have a reduced amount of power available in LTE compared to when the UE has only LTE activated. The available power may affect desired UE behavior. For example, it may be beneficial for the UE to refrain from performing uplink transmissions on multiple carriers (deactivate carrier aggregation), reduce the amount of Channel Quality Indicator (CQI) reporting, Sounding Reference Signal (SRS) transmissions, etc.;

Which service is ongoing in the UE may also be considered in the UE state or device state. For example, a UE that has an ongoing voice call, or a service with similar characteristics, may choose an RRC configuration in which Semi-Persistent Scheduling is used, as compared to the case when it is having only bursty web browsing traffic; and The number of carriers activated for communication for a UE may be part of the UE state. For example, in case a UE has one carrier activated for communication, the UE may use a Scheduling Request, SR, configuration with periodicity P=p. In case the UE has two carriers (carrier 1 and carrier 2) activated for communication, the UE may use SR configurations periodicity P=2*p on carrier 1 and periodicity P=2*p on carrier 2. In this example, the UE may have the same number of opportunities to a send scheduling request in the case when the UE has one carrier activated as when the UE has two carriers activated.

In order for the UE to choose which RRC configuration to use, it will in this solution become aware of the network state and optionally also its own device state. Also, the different states the UE can take may need to be known both by the UE and the network. It may be assumed that the UE is capable of determining its own state, such as mobility state, battery power level, the support of other RATs such as WiFi, etc. It could be unnecessary for the network to configure the UE with all the possible UE states and/or capabilities, e.g. if the UE does not support another RAT, configurations that are dealing with other RATs are not relevant for that UE. As such, the UE may communicate its possible states and/or capabilities, so that the network could configure it only for those states and/or capabilities. Some of the possible UE states can already be communicated in legacy LTE via UE Capability Information exchange mechanisms specified in TS 36.331, e.g. TDD/FDD support, other RAT support, etc., and these mechanisms could be enhanced to support other states and/or capabilities the UE might have.

With regard to the network state, the network needs to communicate some information to the UE that indicates the network state, i.e. the above-described indication of network state. For example, the UE may only need to know an index value, wherein the UE is configured to use the index value to select the configuration that corresponds to the current network state. In this way, the network is able to configure the UE with a proper behavior, i.e. usage of radio parameters, without revealing what the state actually corresponds to. For example, the network states could be communicated as numbers or letters or some other coding, and the RRC configuration illustrated in FIG. 8 is indexed according to these state codes.

Since the mapping between the network state and the communicated index, i.e. the network state indication, can be contained or kept within the network and does not need to be known in the UE, the network state will not be explicitly available in public. This is beneficial as network operators and network vendors may want to avoid revealing the actual network state.

Since the network state may be the same for all UEs, at least within a given area, an optimal way to communicate network state-related information may in such cases be in a broadcast fashion. Such a broadcast can be performed by enhancing the System Information Blocks (SIBs) that are specified in legacy LTE. A network state indication Information Element, IE, could be included in SIB1, for example, which is transmitted with a periodicity of 80 milliseconds. Other SIBs, such as SIB2, are usually transmitted less frequently and may also be used, if it may not be expected for the network state to change more frequently than that.

In some instances, it may be beneficial to communicate the network state to the UEs in a unicast or multicast manner. For example, the network may want to show different states to different UEs, depending on the QoS profile of the UEs. For example, in medium traffic load conditions, the network may broadcast a state index corresponding to the medium state, but it may explicitly communicate a state corresponding to a high traffic load towards UEs with low QoS profile, so that they can be offloaded faster to other cells or RATs. A new RRC message or a MAC control element could be used to communicate the network state in a dedicated manner towards a UE or a group of UEs.

It may be that a UE receives multiple configuration indexes, for example one broadcasted index, one multicasted index and one unicasted index. The UE may therefore be configured to prioritize these multiple indexes differently and act according to the index with the highest priority. One example of prioritization order of multiple indexes is given in the following list, e.g., in order of highest priority to lowest priority:

Unicasted index;
Multicasted index; and
Broadcasted index.

A benefit of such a prioritization scheme in the UE may be that the network may for example only signal an index in a unicast manner to a UE for which the broadcasted index is not suitable. Unnecessary signaling may therefore be avoided as the network can signal unicasted/multicasted only when necessary.

The unicasted/multicasted indexes may also be assigned some expiry time, after which the UE can resort to using broadcasted index instead, as also described above. Alternatively, the network may send an explicit RRC message or a MAC control element that instructs the UE to switch back to the use of a broadcasted or multicasted index.

In some instances, it is beneficial to configure a UE with only one configuration that is to be used regardless of the network state, which may be regarded as a "default configuration." One of the configurations in the table of FIG. 8 may be flagged, i.e. marked, as the default configuration, for example, and a UE may be sent an explicit RRC message or MAC control element to use the default configuration regardless of the network state. The other RRC configurations may become enabled by sending another explicit RRC message or MAC control element. The two messages could be the same but with different values, e.g. flags of 0 or 1. It should be noted that several UEs could also be configured to use only their default configurations by using multi-cast messages. In some instances, if so desired, the network may communicate to all UEs to use their default settings, either by broadcasting a new optional IE in one of the SIBs, or using a special network state value that is reserved for this state.

It may not be necessary for a UE to have a set of RRC configurations that span the whole set of possible network states and optionally possible UE states. For example, the network might know from UE capability information that a UE is not capable of WiFi support. Therefore, it will be unnecessary to have configurations in the set that correspond to UE states that depend on the availability of WiFi. Also, it may not be beneficial to differentiate between some network configurations with regard to some UE states. That is, in the configurations illustrated in the table of FIG. 8, for a possible set of N_n network states and N_u UE states, a given UE can have 1 to N_n*N_u different configurations. And for a given network state N_ni, the possible configurations could range from 0 to N_u. Similarly, for a given UE state N_uj, there could be 0 to N_n different configurations.

Further, it may not be necessary for the UE to receive the set of all possible RRC configurations at once. For example, the UE may be configured to have only the above-mentioned default configuration, and later on additional configurations could be appended to it via new RRC reconfiguration messages. This is regarded as a different philosophy than the legacy RRC reconfigurations, where a new RRC reconfiguration overrides the existing one.

In the discussion so far, the assumption has been that one network node broadcasts its state independently of its neighboring nodes, no matter whether they are using the same or different RATs. However, it might be beneficial for the nodes to communicate at least minimally about their advertised states, to avoid undesired behavior by the UEs. For example, if a node or base station broadcasts a state that corresponds to a high load and its neighbors are already experiencing high load conditions, many UEs might generate measurement reporting since configurations that favor offloading are likely to be enabled due to the broadcasted network state. However, it might not be possible to handover most of the UEs, as the neighbor base stations are also highly loaded. As such, a node upon knowing the state of its neighbors, can either broadcast a different network state than it originally intended to, or it can change the state that is to be seen by a certain set of UEs to a different value, e.g. via explicit or multicast signaling as discussed above. An X2 message may be employed to communicate the network state between different neighbor nodes or base stations.

Figure 10:
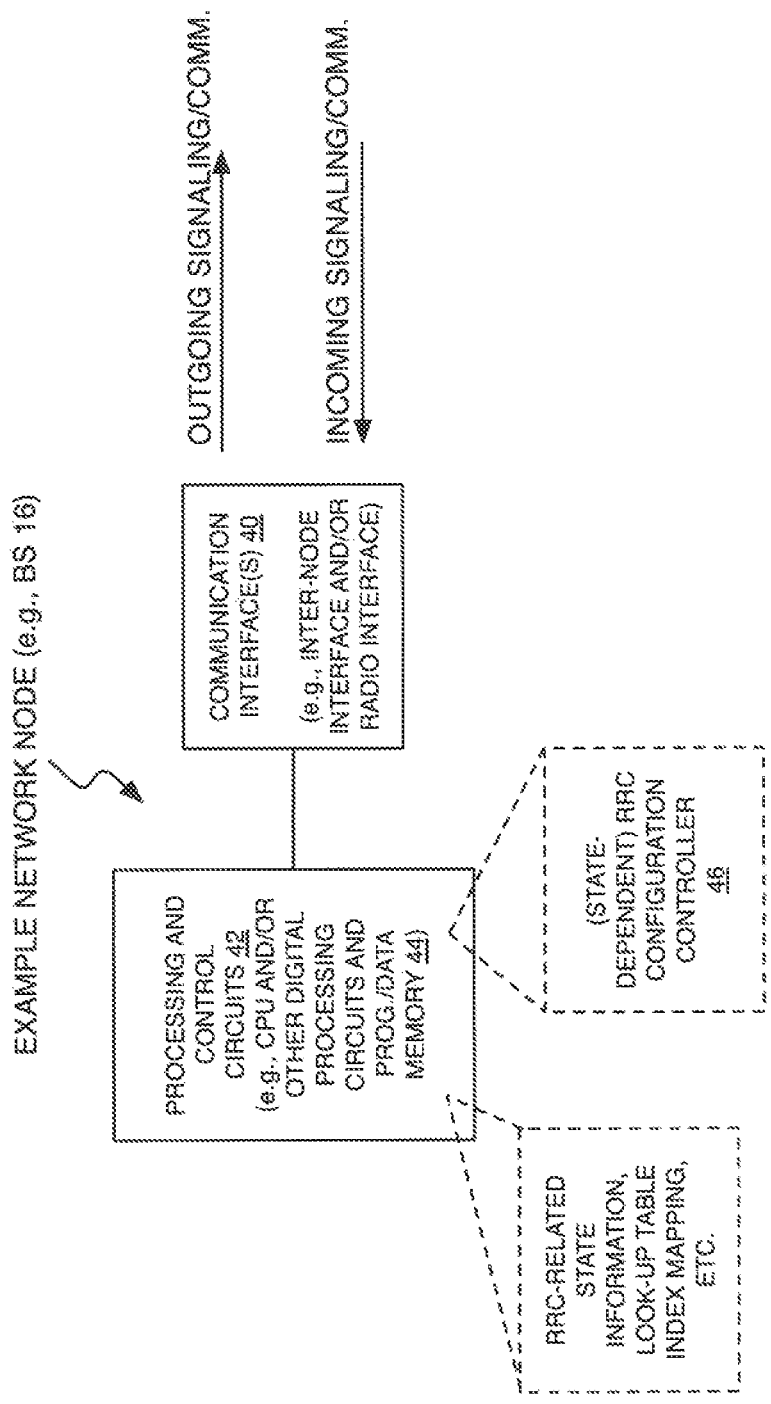
FIG. 10 is a further block diagram illustrating a base station in more detail, according to some possible embodiments.

FIG. 10 illustrates a non-limiting example embodiment of a base station 16, which includes one or more communication interfaces 40, e.g., an air interface comprising radio transceivers and associated processing circuitry for transmitting downlink signals to wireless devices 32 and for receiving uplink signals transmitted by such devices, an inter-base station interface (X2 or other such interface) for communicating with other base stations 16, and one or more interfaces to the CN 22 (S1 or other such interfaces).

The base station 16 further comprises one or more processing and control circuits 42, which are referred to herein as one or more processing circuits 42" or simply as "processing circuits 42". The processing circuits 42 correspond to the element 900b in FIG. 9. It will be appreciated that the processing circuits 42 may comprise fixed circuitry, programmable/programmed circuitry, or some combination of both. In one example, the processing circuits 42 include or are associated with program and data memory 44, which may store RRC-related state information, such as look-up table index mapping information, etc. The memory 44 may comprise more than one memory circuit and more than one type of memory (e.g., volatile and non-volatile storage).

In at least one embodiment, the memory 44 or other computer-readable medium stores a computer program comprising program instructions. Correspondingly, the processing circuits 42 include one or more digital processing circuits that are configured according to the teachings herein, based at least in part on their execution of the stored computer program instructions. Example digital processing circuits include one or more microprocessor-based circuits, microcontroller-based circuits, DSP-based circuits, FPGA and/or CPLD-based circuits, ASIC-based circuits, etc.

According to an example embodiment, a base station 16 or other network node (or nodes, e.g., cooperatively) is configured to carry out a method that includes indicating RRC configurations to a UE that are dependent on network state, UE state, or both. For example, the processing circuits 42 at least functionally include a state-dependent RRC controller 46 that is configured to communicate RRC-related network state information (via the communication interface(s) 40) to wireless devices 32, to support their dynamic state-dependent adaptation of their RRC configurations.

Figure 5:
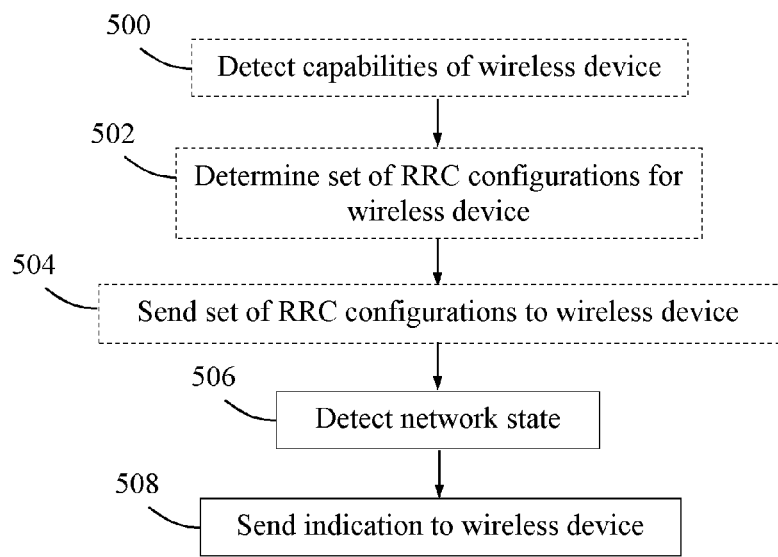
FIG. 5 is another exemplifying flow chart illustrating a procedure in a base station, according to some possible embodiments.

However realized in terms of base station circuitry, the contemplated network-side method, e.g. as described for FIG. 5 above, includes the base station 16 or other network node(s) communicating network state changes to the UEs, to enable UEs to make network state-dependent changes to their RRC configurations. As noted, a look-up table or other index-based mapping scheme, e.g. the look-up table in FIG. 8, may be used to efficiently indicate state information to UEs. Broadly, such operation provides for a dynamic, state-dependent adaptation of RRC configurations without imposing undue complexity and without imposing a substantial signaling overhead.

According to this embodiment, the base station 900 may be structured according to the example of base station 16 in FIG. 10. In this figure, the base station 16 is arranged to control usage of an RRC configuration in radio communication between a wireless device 32 and the base station 16. The base station 16 may be configured to operate according to any of the examples and embodiments of employing the solution as described above and as follows. The base station 16 comprises an RRC configuration controller 46 that is configured to send an indication 706 reflecting a network state of the wireless communication network 702 to the wireless device 32, as of action 508 above, to enable the wireless device 32 to select an RRC configuration out of a set of RRC configurations 704 based on the indication 706 reflecting the network state. Each RRC configuration in the set comprises a plurality of radio parameters dictating how the wireless device 32 should operate during radio communication in the wireless communication network 702. The RRC configuration controller 46 may further be configured to determine the set of RRC configurations 704 for the wireless device 32, as of action 502 above. The RRC configuration controller 46 may also be configured to send the set of RRC configurations 704 to the wireless device, as of action 504 above, e.g. if the device is turned on in the cell served by the base station 16 such that the base station 16 becomes the first one serving the wireless device 32. Further, the RRC configuration controller 46 may be configured to detect a state of the wireless communication network 702, as of action 506 above. The RRC configuration controller 46 may also be configured to detect capabilities of the wireless device 32 in order to determine the set of RRC configurations 704, as of action 500 above.

Figure 11:
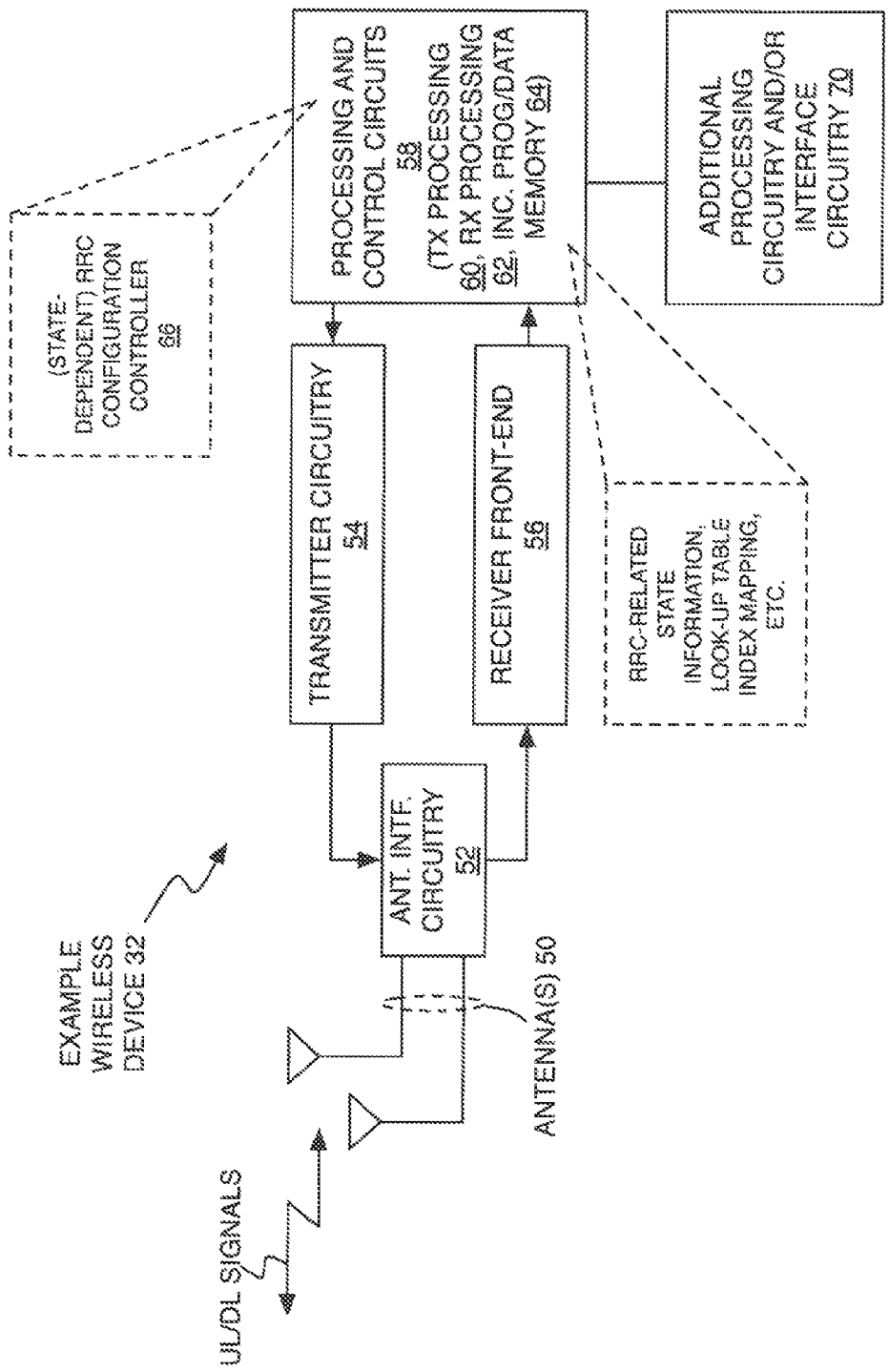
FIG. 11 is a further block diagram illustrating a wireless device in more detail, according to some possible embodiments.

FIG. 11 illustrates an example embodiment of a wireless device 32, which includes one or more transmit/receive (TX/RX) antennas 50, antenna interface circuitry 52, transmitter circuitry 54 (e.g., modulation and/or power amplification), a receiver front-end 56 (e.g., filtering, amplification, down-conversion/digitization of antenna-received signals), and processing and control circuits 58. The processing and control circuits 58 are generally referred to as one or more processing circuits 58" or simply as "processing circuits 58." The processing circuits 58 correspond to the element 700b in FIG. 7.

In terms of general functional circuitry, the processing circuits 58 include transmit signal processing circuits 60, and receiver processing circuits 62. It will be appreciated that the processing circuits 58 may comprise fixed circuitry, programmable/programmed circuitry, or some combination of both. In one example, the processing circuits 58 include or are associated with program and data memory 64, which may store RRC-related state information, such as look-up table index mapping information, etc. The memory 64 may comprise more than one memory circuit and more than one type of memory (e.g., volatile and non-volatile storage).

In at least one embodiment, the memory 64 or other computer-readable medium stores a computer program comprising program instructions. Correspondingly, the processing circuits 58 include one or more digital processing circuits that are configured according to the teachings herein, based at least in part on their execution of the stored computer program instructions. Example digital processing circuits include one or more microprocessor-based circuits, microcontroller-based circuits, DSP-based circuits, FPGA and/or CPLD-based circuits, ASIC-based circuits, etc.

The example wireless device 32 also may include additional processing and/or interface circuitry 70. The extent and nature of the additional processing/interface circuitry 70 depends on the intended use and features of the wireless device 32.

Thus, it is contemplated herein that a device-side method includes a wireless device 32 that is configured to: receive information indicating or otherwise identifying one or more RRC configurations that are dependent on network state; and, correspondingly, to dynamically select/apply the RRC configuration that matches the current network state and optionally also the device state.

The example wireless device 32 at least functionally includes a state-dependent RRC configuration controller 66 that is configured to:
  receive and process information sent from the network that indicates or otherwise identifies, e.g., a set of state-dependent RRC configurations;
  determine the current network and/or UE states (e.g., from among a number of known or defined states, and, e.g., responsive to signaled or detected state changes at the network and optionally also at the wireless device 32); and
  select and apply the RRC configuration that matches the signaled or detected state(s).

The RRC configuration controller 66 may be configured to apply a prioritization scheme to its RRC configuration selection decisions, e.g., it may base its selections on state information sent to it via unicast signaling over state information sent to it via multicast signaling, and it may prioritize state information sent via multicast signaling over that sent via broadcast signaling.

Further, the RRC configuration controller 66 may select/apply a default RRC configuration under certain circumstances, and then change from the default configuration responsive to detected state changes—here, a state change may be "detected" based on any one or more of receiving signaling from the network indicating a change in network state; implicitly detecting network state changes at the wireless device 32; and detecting wireless device state changes at the wireless device 32.

Also, as noted, the RRC configuration controller 66 at the wireless device 32 may be configured to receive shorthand indications of RRC configurations and/or state changes. For example, it may receive index values or other pointer-like information that it uses to map into a look-up table or other such data structure.

According to this embodiment, the wireless device 700 may be structured according to the example of wireless device 32 in FIG. 11. In this figure, the wireless device 32 is arranged to apply an RRC configuration in a radio communication between the wireless device 32 and a base station 16 of a wireless communication network 702. The wireless device 32 may be configured to operate according to any of the examples and embodiments of employing the solution as described above and as follows. The wireless device 32 comprises an RRC configuration controller 66 that is configured to receive or obtain a set of RRC configurations 704 from the wireless communication network 702, each RRC configuration in the set comprising a plurality of radio parameters dictating how the wireless device 32 should operate during radio communication in the wireless communication network, basically as described e.g. for actions 200 and 400 above. The RRC configuration controller 66 is further configured to receive from the serving base station 16 an indication 706 reflecting a network state of the wireless communication network 702, basically as described e.g. for actions 202 and 402 above, and to select an RRC configuration out of the set of RRC configurations 704, based on the indication 706 reflecting the network state, basically as described e.g. for actions 204 and 406 above. The RRC configuration controller 66 is also configured to apply the selected RRC configuration in the radio communication with the serving base station 16, basically as described e.g. for actions 206 and 408 above.

An advantage of at least some of the embodiments herein is that by configuring UEs with multiple RRC configurations that correspond to different network states and optionally also different UE states, the network in question is able to obtain flexible and dynamic UE behavior that fits the current network state and possibly also the current UE state, without the need to make explicit reconfiguration of each and every UE involving lengthy reconfiguration messages as explained above.

While the solution has been described with reference to specific exemplary embodiments, the description is generally only intended to illustrate the inventive concept and should not be taken as limiting the scope of the solution. For example, the terms "wireless device", "base station", "RRC configuration", "radio parameters", "network state", "device state", "indication", and "look-up table" have been used in this description, although any other corresponding entities, functions, and/or parameters could also be used having the features and characteristics described here. The solution is defined by the appended claims.

The invention claimed is:

1. A method, performed by a wireless device, to apply a Radio Resource Control, RRC, configuration in a radio communication between the wireless device and a base station of a wireless communication network, the method comprising:
  obtaining a set of RRC configurations, each RRC configuration in the set comprising a plurality of radio parameters dictating how the wireless device should operate during radio communication in the wireless communication network;
  receiving from the base station an indication reflecting a network state of the wireless communication network;
  selecting an RRC configuration out of the set of RRC configurations, based on the received indication reflecting the network state and further based on a device state reflecting a state of the wireless device;
  applying the selected RRC configuration in the radio communication with the base station; and
  informing the base station about the selected RRC configuration.

2. The method according to claim 1, wherein the network state pertains to at least one of: a load of the wireless communication network and one or more features active in the wireless communication network.

3. The method according to claim 1, wherein the device state pertains to at least one of: traffic activity of the wireless device, the wireless device's capability of using radio technologies, one or more radio technologies used by the wireless device, the wireless device's remaining battery power level, the wireless device's usage of one or more radio bearers, the wireless device's amount of available power, the wireless device's usage of one or more services, and number of carriers used by the wireless device.

4. The method according to claim 1, comprising selecting the RRC configuration from a look-up table which maps the set of RRC configurations to different indications reflecting network states.

5. The method according to claim 4, wherein the look-up table further maps the set of RRC configurations to different device states.

6. The method according to claim 1, wherein the radio parameters in the set of RRC configurations pertain to at least one of: measurements of radio signals, reporting of measurements, transmission schemes, encoding and modulation.

7. The method according to claim 1, wherein the indication reflecting the network state is received from the base station in at least one of: broadcast signalling, multicast signalling targeted to a group of wireless devices including the wireless device and unicast signalling targeted to the wireless device.

8. The method according to claim 7, wherein the wireless device prioritizes selecting RRC configuration based on the indication in the unicast signalling over selecting RRC configuration based on the indication in the multicast signalling and prioritizes selecting RRC configuration based on the indication in the multicast signalling over selecting RRC configuration based on the indication in the broadcast signalling.

9. The method according to claim 8, wherein the unicasted indication and/or the multi-casted indication is assigned an expiry time after which the wireless device selects RRC configuration based on the broadcasted indication instead.

10. The method according to claim 1, wherein the obtained set of RRC configurations comprises a first subset of RRC configurations valid in several cells of the wireless communication network and a second subset of cell-specific RRC configurations valid only when the wireless device is connected to the base station.

11. The method according to claim 1, wherein the obtained set of RRC configurations is device-specific and adapted in accordance with capabilities of the wireless device.

12. The method according to claim 1, wherein the set of RRC configurations is obtained by being received from the base station.

13. A wireless device arranged to apply a Radio Resource Control, RRC, configuration in a radio communication between the wireless device and a base station of a wireless communication network, the wireless device comprising:
  a receiver configured to receive from the base station an indication reflecting a network state of the wireless communication network; and
  a processing circuit configured to have access to a set of RRC configurations, each RRC configuration in the set comprising a plurality of radio parameters dictating how the wireless device should operate during radio communication in the wireless communication network, and to select an RRC configuration out of the set of RRC configurations based on the indication reflecting the network state and a device state reflecting a state of the wireless device, and further configured to apply the selected RRC configuration in the radio communication with the base station and inform the base station about the selected RRC configuration.

14. The wireless device according to claim 13, wherein the network state pertains to at least one of: a load of the wireless communication network and one or more features active in the wireless communication network.

15. The wireless device according to claim 13, wherein the device state pertains to at least one of: traffic activity of the wireless device, the wireless device's capability of using radio technologies, one or more radio technologies used by the wireless device, the wireless device's remaining battery power level, the wireless device's usage of one or more radio bearers, the wireless device's amount of available power, the wireless device's usage of one or more services, and number of carriers used by the wireless device.

16. The wireless device according to claim 13, wherein the processing circuit is configured to select the RRC configuration from a look-up table which maps the set of RRC configurations to different indications reflecting network states.

17. The wireless device according to claim 16, wherein the look-up table further maps the set of RRC configurations to different device states.

18. The wireless device according to claim 13, wherein the radio parameters in the set of RRC configurations pertain to at least one of: measurements of radio signals, reporting of measurements, transmission schemes, encoding and modulation.

19. The wireless device according to claim 13, wherein the receiver is configured to receive the indication reflecting the network state from the base station in at least one of: broadcast signalling, multicast signalling targeted to a group of wireless devices including the wireless device and unicast signalling targeted to the wireless device.

20. The wireless device according to claim 19 wherein the processing circuit is further configured to prioritize selecting RRC configuration based on the indication in the unicast signalling over selecting RRC configuration based on the indication in the multicast signalling and to prioritize selecting RRC configuration based on the indication in the multicast signalling over selecting RRC configuration based on the indication in the broadcast signalling.

21. The wireless device according to claim 20, wherein the unicasted indication and/or the multi-casted indication is assigned an expiry time after which the processing circuit is configured to select RRC configuration based on the broadcasted indication instead.

22. The wireless device according to claim 13, wherein the set of RRC configurations comprises a first subset of RRC configurations valid in several cells of the wireless communication network and a second subset of cell-specific RRC configurations valid only when the wireless device is connected to the base station.

23. The wireless device according to claim 13, wherein the set of RRC configurations is device-specific and adapted in accordance with capabilities of the wireless device.

24. The wireless device according to claim 13, wherein the receiver is configured to receive the set of RRC configurations from the base station.

25. A method, performed by a base station of a wireless communication network, to control usage of a Radio Resource Control, RRC, configuration in a radio communication between a wireless device and the base station, the method comprising:

sending an indication reflecting a network state of the wireless communication network to the wireless device to enable the wireless device to select an RRC configuration out of a set of RRC configurations based on the indication reflecting the network state, each RRC configuration in the set comprising a plurality of radio parameters dictating how the wireless device should operate during radio communication in the wireless communication network;

receiving information from the wireless device about the selected RRC configuration; and applying the selected RRC configuration in the radio communication between the wireless device and the base station.

26. The method according to claim 25, further comprising detecting capabilities of the wireless device, determining the set of RRC configurations for the wireless device in dependence on the detected capabilities, and sending the set of RRC configurations to the wireless device.

27. A base station of a wireless communication network, the base station being arranged to control usage of a Radio Resource Control, RRC, configuration in radio communication between a wireless device and the base station, the base station comprising:

radio circuitry configured for communicating with the wireless device; and processing circuitry operatively associated with the radio circuitry and configured to:

send an indication reflecting a network state of the wireless communication network to the wireless device to enable the wireless device to select an RRC configuration out of a set of RRC configurations based on the indication reflecting the network state, each RRC configuration in the set comprising a plurality of radio parameters dictating how the wireless device should operate during radio communication in the wireless communication network;

receive information from the wireless device about the selected RRC configuration; and apply the selected RRC configuration in the radio communication between the wireless device and the base station.

28. The base station according to claim 27, wherein the processing circuitry is configured to detect capabilities of the wireless device, determine the set of RRC configurations for the wireless device in dependence on the detected capabilities, and send the set of RRC configurations to the wireless device.

* * * * *